United States Patent
Wolleschensky et al.

(10) Patent No.: US 7,323,679 B2
(45) Date of Patent: Jan. 29, 2008

(54) PROCEDURE FOR THE OPTICAL ACQUISITION OF OBJECTS BY MEANS OF A LIGHT RASTER MICROSCOPE WITH LINE BY LINE SCANNING

(75) Inventors: Ralf Wolleschensky, Apolda (DE); Frank Hecht, Weimar (DE); Ralf Engelmann, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 143 days.

(21) Appl. No.: 10/967,326

(22) Filed: Oct. 19, 2004

(65) Prior Publication Data

US 2006/0011859 A1 Jan. 19, 2006

(30) Foreign Application Priority Data

Jul. 16, 2004 (DE) .................. 10 2004 034 951

(51) Int. Cl.
*H01J 3/14* (2006.01)
*G01J 1/58* (2006.01)
(52) U.S. Cl. .................. 250/234; 250/458.1
(58) Field of Classification Search ............. 250/234, 250/458.1, 459.1; 359/368
See application file for complete search history.

(56) References Cited

U.S. PATENT DOCUMENTS 4,927,254 A 5/1990 Kino et al.
6,028,306 A 2/2000 Hayashi
6,167,173 A 12/2000 Schoeppe et al.
6,194,718 B1* 2/2001 Dotan ................. 250/310
6,947,127 B2 9/2005 Wolleschensky et al.

FOREIGN PATENT DOCUMENTS

DE 2360197 A1 6/1975
DE 19702753 A1 7/1998
DE 10257237 A1 6/2003
WO WO 88 07695 10/1988

OTHER PUBLICATIONS

Gustafsson M., "Doubling the lateral resolution of wide-field fluorescence microscopy using structured illumination," in "Three-dimensional and multidimensional microscopy: Image acquisition processing VII", Proceedings of SPIE, vol. 3919, pp. 141-150 (2000).
Schmidt, H et al., "Mutational analysis of dendritic Ca2+ kinetics in rodent Purkinje cells: rote of parvalbumin and calbindin D28k," J. Physiol. 551:13-32 (2003).

(Continued)

*Primary Examiner*—Thanh X. Luu
(74) *Attorney, Agent, or Firm*—Jacobson Holman PLLC

(57) ABSTRACT

Procedure for the image acquisition of objects by means of a light raster microscope with line by line scanning, whereas a scanning of the probe for the creation of a probe image occurs in scanning steps and the distance between at least two scanning steps is variably adjustable and at least a second scanning of the probe occurs, during which the position of the scanning steps is shifted with regard to the scanning direction, whereas preferably a line by line scanning of the probe is carried out.

9 Claims, 8 Drawing Sheets

OTHER PUBLICATIONS

Brum, G et al., "Fast imaging in two dimensions resolves extensive sources of Ca2+ sparks in frog skeletal musele," J. Physiol. 528:419-433 (2000).

Abdul-Karim, Ma, et al., "Automated tracing and change analysis of angiogenic vasculature from in vivo multiphoton confocal image time series," Microvasc. Res., 66:113-125 (2003).

Umenishi, F. et al., Biophys. J., "cAMP Regulated Membrane Diffusion of a Green Fluorescent Protein-Aquaporin 2 Chimera," 78:1024-1035 (2000).

Zhang, HL et al., "Neurotrophin-induced Transport of a β-Actin mRNP Complex Increases β-Actin Levels and Stimulates Growth Cone Motility," Neuron, 31:261-2 (2001).

Petersen, M. A. and Dailey, M. E., "Diverse Microglial Motility Behaviors During Clearance of Dead Cells in Hippocampal Slices," Glia, 46:195-206 (2004).

Yamamoto, N. et al., "Real-time imaging of individual fluorescent-protein color-coded metastatic colonies in vivo," Clin. Exp. Metastasis, 20:633-638 (2003).

Bertera, S. et al., "Body window-enabled in vivo multicolor imaging of transplanted mouse islets expressing an insulin-Timer fusion protein," Biotechniques, 35:718-722 (2003).

Pawley, J., "Handbook of Biological Confocal Microscopy," Plenum Press, pp. 461 ff. (1994).

* cited by examiner

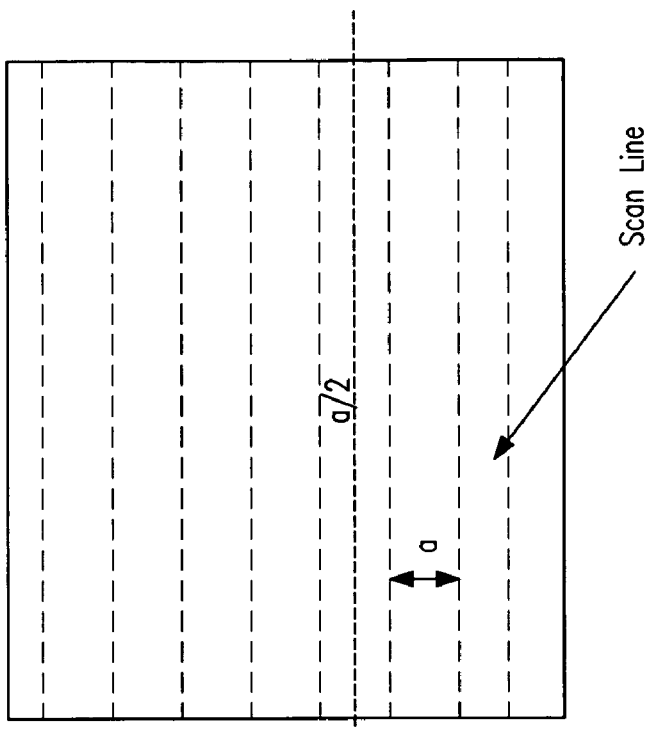
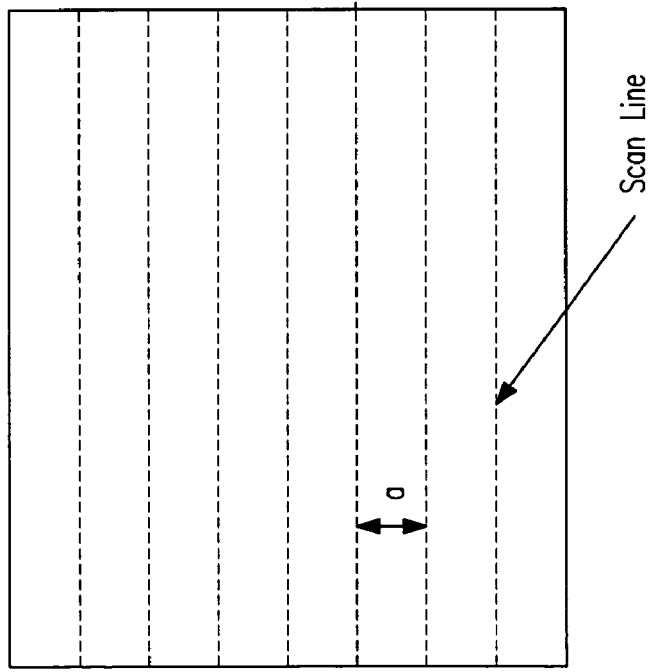

Image recorded using subject invention

Objects moving quickly in relating to the imaging speed

Static objects, i.e. objects moving slowly in relating to the imaging speed

Faster and slower objects superimposed on one another

Image recorded with high optical resolution. Corresponds to original image.

Figure 2:
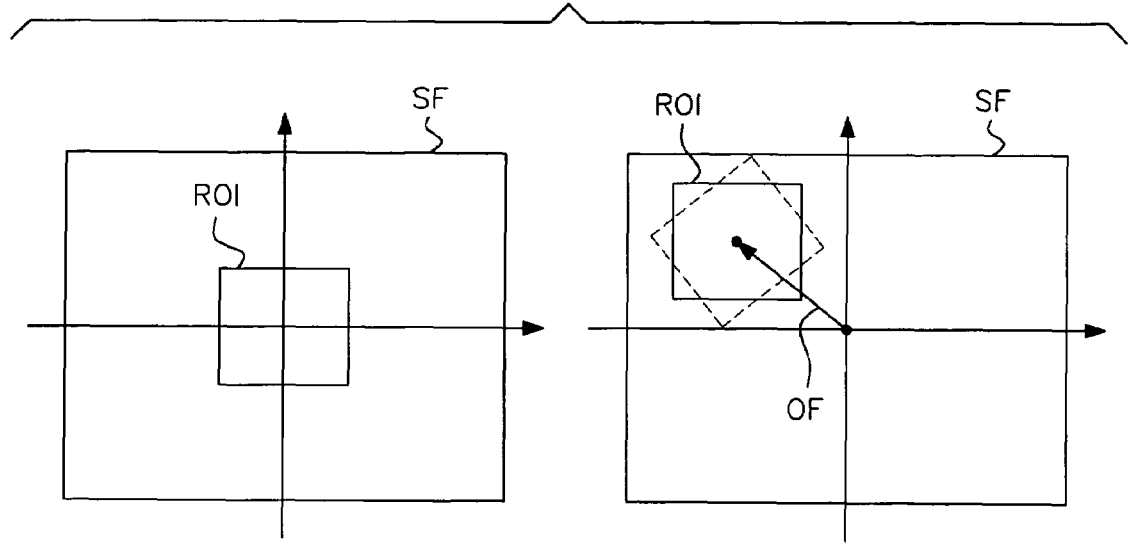

FIG. 10
Illumination by the reference acquisition
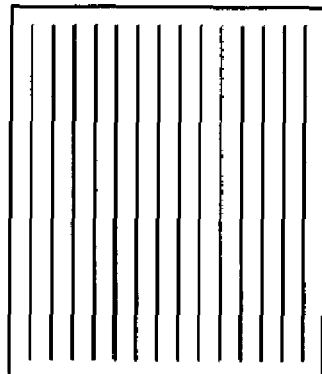
Fig. 2
Illumination by the nested acquisition
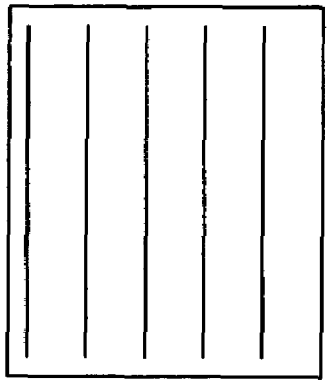
1st Image
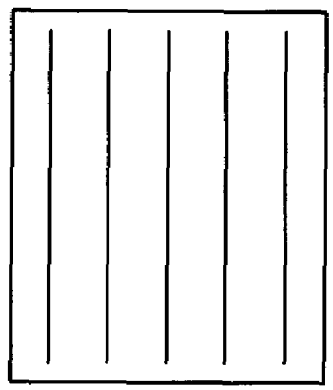
2nd Image
3rd Image
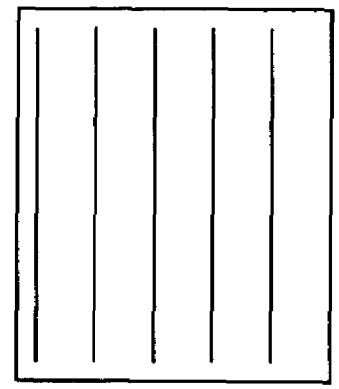
4th Image (Like the 1st Image)

PROCEDURE FOR THE OPTICAL ACQUISITION OF OBJECTS BY MEANS OF A LIGHT RASTER MICROSCOPE WITH LINE BY LINE SCANNING

The invention is explained in detail in the following with reference to the drafts.

Figure 1:
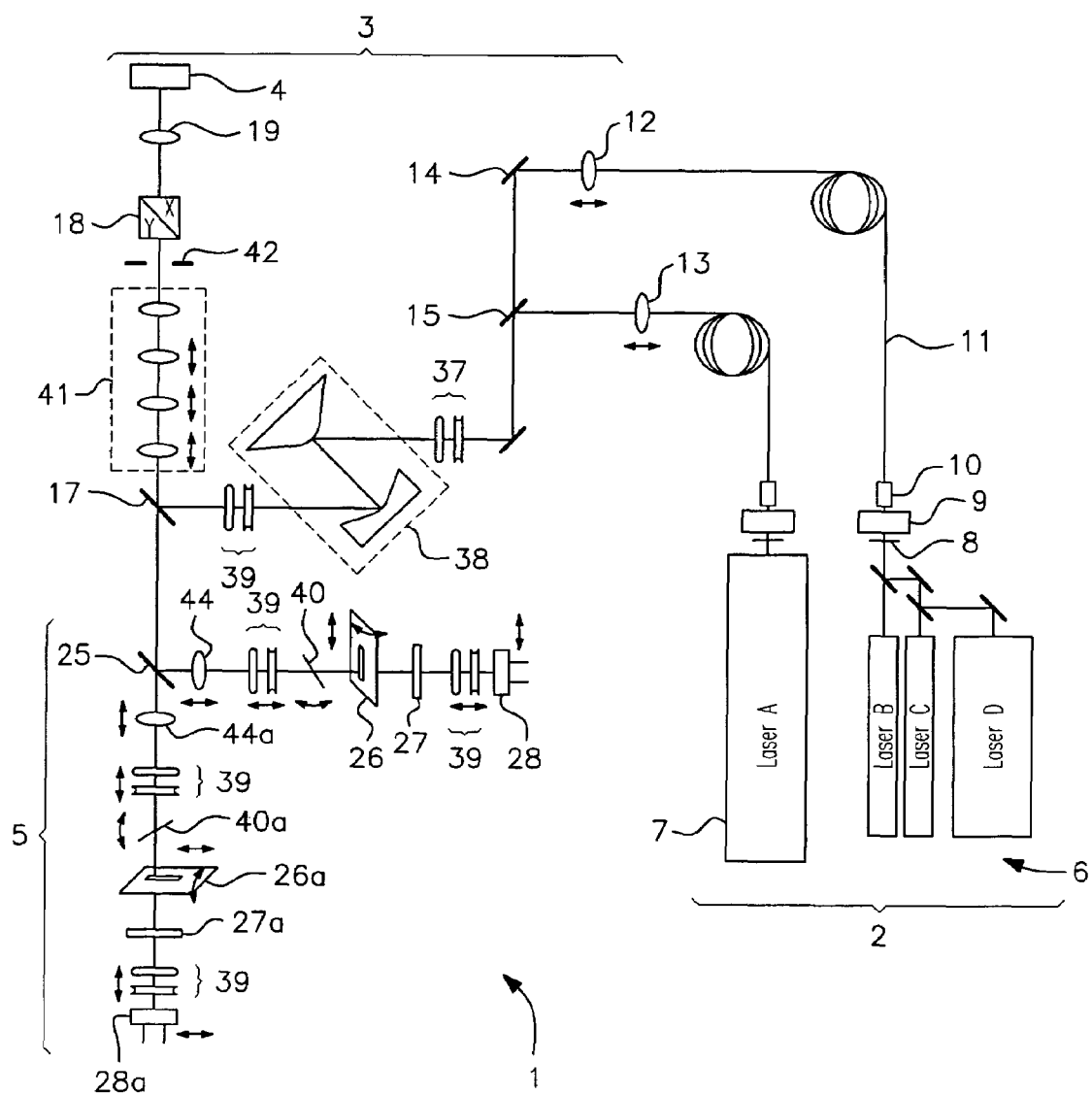

FIG. 1 shows a scheme of a laser scanning microscope 1, which basically consists of five components: a radiation source model 2, which produces the stimulating radiation for the laser scanning microscopy, a scan module 3, which conditions the stimulating radiation and diffracts over a probe for scanning, a simplified scheme of microscope module 4 directing the scanning radiation, which is produced by the scan module, in a microscopic optical path towards a probe, as well as detector module 5, which receives and detects optical radiation from the probe. As may be seen in FIG. 1, the detector module 5 may be designed with several spectral channels.

As a general description of a laser scanning microscope with point-wise scanning, it is referred to DE 19702753A1, which thus forms part of the description at hand.

The radiation source module 2 produces light radiation, which is suitable for laser scanning microscopy, i.e. particularly radiation which may trigger fluorescence. Depending on the application, the radiation source module shows several radiation sources. In a represented construction, two lasers 6 and 7 are provided with a subsequent light valve 8 and an attenuator 9 which couple their radiation by means of a coupling 10 into an optical fiber 11. The light valve 8 functions as a baffle, by which a beam deactivation may be achieved without having to deactivate the operation of the laser in laser unit 6 or 7. The light valve 8 may for example be designed as AOTF which deviates the laser beam for beam deactivation before coupling into the optical fiber 11 towards a light trap, which not represented here.

In the exemplary representation of FIG. 1, laser unit 6 shows three lasers B, C, D, whereas laser unit 7 only includes laser A. The representation thus serves as an example for a combined single and multi wave length laser, coupled to one or several fibers. The coupling may also occur via several fibers at the same time, the radiation of which is mixed by a color merger after passing through adaptation optics. It is thus possible to use various wave lengths or ranges for the stimulating radiation.

The radiation coupled in optical fiber 11 is combined through flexible collimate optics 12 and 13 via beam combination mirrors 14, 15 and changed in a beam forming unit regarding the beam profile.

The collimators 12, 13 ensure that the radiation provided to scan module 3 by radiation source module 2 is collimated in an indefinite optical path. This preferably occurs with a single objective which by moving along the optical axis and controlling a (not represented) central control unit has a focus function, so that the distance between collimator 12, 13 and the corresponding end of the optical fiber may be modified. The beam forming unit, which will be explained later in detail, forms from the rotation symmetric Gauβ shaped profiled laser beam, as it occurs after the ray merging mirrors 14, 15, a linear beam which is no longer rotation symmetric, but rather creates a rectangular illuminated field in profile.

This light beam, which is also described as linear, serves as a stimulating radiation and is led via primary color separator 17 and a zoom objective, which is yet to be described, to a scanner 18. The primary color separator is described later, at this point it shall simply be said that it separates the probe radiation, which returns from the microscope module 4, from the stimulating radiation.

The scanner 18 deviates the linear beam uniaxially or biaxially, after which it is bundled by a scan lens 19 as well as by a tubus lens and a lens of the microscope module 4 into a focus 22, which is located in a compound or probe. The optical image is created in a way that the probe is illuminated in a caustic line with stimulating radiation.

This fluorescent radiation stimulated in the linear focus travels via objective and tubus lens of the microscope module 4 and the scan lens 19 back to the scanner 18, so that in the opposite direction an inactive beam results from the scanner 18. Therefore, we also say that the scanner 18 de-scans the fluorescent radiation.

The primary color separator 17 lets the fluorescent radiation pass, which is located in wave length areas other than the stimulating radiation, so that it may be deviated via a deviation mirror 24 in the detector module 5 and then analyzed. The detector module 5 shows several spectral channels in the layout of FIG. 1, i.e. the fluorescent radiation coming from the deviation mirror 24 is divided into two spectral channels in an auxiliary color separator 25.

Each spectral channel features a slotted aperture 26, which realizes a confocal or partially confocal image in reference to probe 23 and the size of which determines the depth of focus with which the fluorescent radiation may be detected. The geometry of the slotted aperture 26 thus determines the sectional plane within the (thick) preparation, from which the fluorescent radiation is detected.

The slotted aperture 26 is followed by a block filter 27 blocking unwanted stimulating radiation which entered the detector module 5. The linearly expanded radiation, which is separated in this way, is then analyzed by an appropriate detector 28. The second spectral detection channel is designed analogously to the described color channel; it also contains a slotted aperture 26a, a block filter 27a as well as a detector 28a.

The use of a confocal slotted aperture in detector module 5 is only an example. Of course, a single point scanner may also be used. The slotted apertures 26, 26a, are then replaced by hole apertures and the beam forming unit may then be eliminated. Otherwise, all optics are designed rotation symmetric for this model. Instead of a point-wise scanning and detection, any multi-point configuration such as point clouds or the Nipkow disc concept may be used, as explained later according to FIGS. 3 and 4. However, it is then important that the detector 28 achieves local resolution, since a parallel acquisition of several probe points occurs during the scanner's sweep.

FIG. 1 shows that the Gauβ ray beam present according to the mobile or flexible collimates 12 and 13 is united over mirror stairs with a ray merging mirror 14, 16 and is subsequently converted into a ray beam with rectangular ray profile in the model shown with a slotted aperture. In the model of FIG. 1, the beam forming unit uses a cylinder telescope 37 with a subordinated aspherical unit 38 and subsequent cylinder optics 39.

The transformation produces a ray which basically illuminates a rectangular field in a profile plane, whereas the intensity distribution along the longitudinal axis of the field is not Gauβ-shaped but rather box-shaped.

The lighting configuration with the aspheric unit 38 may serve to evenly fill a pupil between a tubus lens and an objective. In this way, the optical resolution of the objective may be fully utilized. This option is therefore also appropriate in a single point or multi point scanning microscope system, e.g. in a line scanning system (in the latter additionally to the axis in which the probe is focused).

The linear conditioned stimulating radiation is directed towards the primary color separator 17. It is finished in a preferred design with a spectrally neutral separator mirror according to DE 10257237 A1, the content of which is fully included herein. The term "color separator" thus also includes non-spectral separating systems. Instead of the described spectrally independent color separator, a homogenous neutral separator (e.g. 50/50, 70/30, 80/20 or similar.) or a dichroic separator may also be used. To allow a selection according to the application; the main color separator is preferably equipped with a mechanism allowing a simple switch, for example by means of a corresponding separator wheel containing individual exchangeable separators.

A dichroic primary color separator is particularly suitable to detect coherent or directed radiation, such as reflection, Stokes' or anti-Stokes' Raman spectroscopy, coherent Raman processes of higher order, generally parametric non-linear optical processes, such as Second Harmonic Generation, Third Harmonic Generation, Sum Frequency Generation, dual and multi photon absorption or fluorescence. Several of these procedures of the non-linear optical spectroscopy require the use of two or several laser beams which are collinearly superimposed. Herein, the represented merging of several laser rays is particularly beneficial. Basically, the dichroic ray separators common in fluorescence microscopy may be used. It is also beneficial for Raman microscopy to use holographic notch separators or filters prior to the detectors in order to suppress the Rayleigh distribution fraction.

In the construction of FIG. 1, the stimulating radiation or light radiation is fed to scanner 18 via motor controlled zoom optics 41. Therewith, the zoom factor may be adjusted and the scanned visual field is continuously variable in a certain regulating range. Particularly beneficial is a zoom optic where during the adjustment of the focal position and the image scale, the pupil position is maintained in the continuous variable procedure. The three motor degrees of freedom of zoom optic 41, symbolized in FIG. 1 with arrows, exactly correspond to the number of degrees of freedom provided for the adjustment of the three parameters, image scale, focal and pupil position. Particularly preferable is a zoom optic 41 equipped with a fixed aperture 42 on its departure side. In a practical simple realization, the aperture 42 may also be predetermined by the limitation of the mirror surface of scanner 18. The aperture 42 on the departure side with zoom optic 41 achieves that, regardless of the adjustment of the zoom enlargement, a fixed pupil diameter is always projected onto the scan lens 19. The objective pupil thus remains fully illuminated in any position of zoom optic 41. The use of an independent aperture 42 prevents the occurrence of any unwanted scatter in the area of scanner 18.

Zoom optic 41 cooperates with cylinder telescope 37, which may also be motor activated and is located in front of the aspheric unit 38. This option has been chosen in the construction of FIG. 2 to create a compact design; however, it is not mandatory.

If a zoom factor smaller than 1.0 is required, the cylinder telescope 37 is automatically pivoted into the optical path. It prevents an incomplete illumination of the aperture 42, when the zoom lens 41 is reduced. The pivoted cylinder telescope 37 thus guarantees that even in zoom factors smaller than 1, i.e. regardless of the adjustment of zoom optic 41, an illumination line of constant length is always present at the location of the objective pupil. Compared to a zoom with a simple visual field, laser performance losses in the light beam may thus be avoided.

Since in the pivoting of the cylinder telescope 37 an image brightness shift in the illumination line is inevitable, the (not represented) control unit is designed in a way that the advance speed of scanner 18 or an amplification factor of detectors in detector module 5 is correspondingly adjusted in the activated cylinder telescope 37, in order to keep the image brightness steady.

Apart from the motor driven zoom optic 41 as well as the motor activated cylinder telescope 37, remote controlled adjusting elements are also included in the detector module 5 of the laser scanning microscope of FIG. 1. In order to compensate longitudinal color errors, for example in front of the slotted aperture, a panorama optic 44 as well as a cylinder optic 39 and immediately in front of the detector 28, a cylinder optic 39 is included, which may be motor relocated along the axis.

In addition to the compensation of errors, a correction unit 40 is included, which will be briefly described below.

Together with the preceding panorama optic 44, the aperture 26 as well as the preceding first cylinder optic 39 and the following second cylinder optic form a pinhole object of detector configuration 5, whereas the pinhole is realized here by the slotted aperture 26. In order to prevent unwanted detection of any stimulating radiation reflecting in the system, the cylinder lens 39 is preceded by a block filter 27, which shows appropriate spectral characteristics and allows only the desired fluorescent radiation to reach the detector 28, 28a.

A modification of the color separator 25 or the block filter 27 inevitably leads to a certain tilt or wedge error at the time of pivoting. The color separator may lead to an error between the test area and the slotted aperture 26, the block filter 27 to an error between slotted aperture 26 and detector 28. In order to prevent that a readjustment of the position of the slotted aperture 26 or the detector 28 is required, a plane-parallel disc 40 is located between the panorama optic 44 and the slotted aperture 26, i.e. in the optical path of the image or the detector 28, which may be brought into different tilting positions with a controller. The plane-parallel plate 40 is therefore installed in an appropriate adjustable holder.

FIG. 2 shows how with the help of the zoom optic 41 a region of interest ROI may be selected within the available maximum scan field SF. If the drive of the scanner 18 remains so that the amplitude does not change, as this may be required in resonance scanners, an enlargement of more than 1.0 adjusted on the zoom optic leads to a restriction of the region of interest centered around the optical axis of the scan field SF.

Resonance scanners are described for example in Pawley, Handbook of Biological Confocal Microscopy, Plenum Press 1994, page 461ff.

If the scanner is controlled in such a way that it scans asymetrically to the optical axis or to the idle position of the scanner mirror, an offset of the region of interest ROI is achieved in connection with a zoom effect. Through the already indicated descanning effect of the scanner 18 and by running the zoom optic 41 again, the selection of the region of interest ROI in the optical path of detection is eliminated again towards the detector. Any selection within the scan field SF may thus be made for the region of interest ROI. In addition, images may be received for different selections of the region of interest ROI and may then compose those to a high-resolution image.

If the region of interest ROI shall not only be shifted with an offset in reference to the optical axis but at the same time also rotated, a construction is appropriate which provides an Abbe-Koenig prism in a pupil of the optical path between primary color separator 17 and probe 23, which as is known leads to an image field rotation. This is also eliminated towards the detector. Now images with various offsets and angles of rotation may be measured and then combined to a high-resolution image, e.g. according to an algorhithm, as described in a publication by Gustafsson, M., "Doubling the lateral resolution of wide-field fluorescence microscopy using structured illumination", in "Three-dimensional and multidimensional microscopy: Image acquisition processing VII", Proceedings of SPIE, Vol. 3919 (2000), p 141-150.

Figure 3:
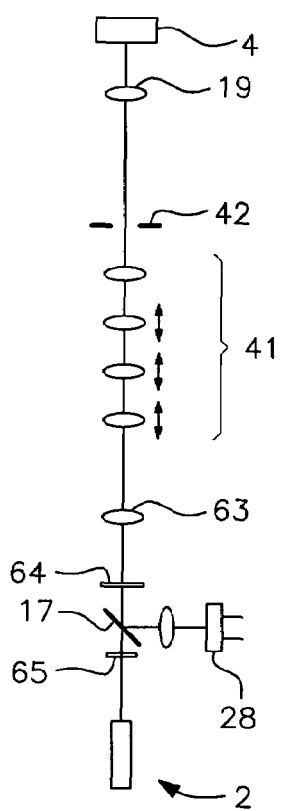

FIG. 3 shows a further possible construction for a laser scanning microscope 1, where a Nipkow disc approach is realized. The light source module 2, which is represented in a very simplified version in FIG. 3, illuminates a Nipkow disc 64 via mini lens array 65 through the primary color separator 17, as described in U.S. Pat. No. 6,028,306, WO 88 07695 or DE 2360197 A1 for example. The pinholes in the Nipkow disk, which are illuminated through the mini lens array, are projected onto the probe in microscope module 4. In order to be able to vary the image size of the probe here as well, a zoom optic 41 is provided.

In modification of the construction in FIG. 1, in the Nipkow scanner the illumination occurs through the opening of the primary color separator 17 and the radiation, which shall be detected, is reflected. In addition, in modification of FIG. 2, the detector 28 is now designed to achieve local resolution, so that the multipoint illumination achieved with Nipkow disk 64 is also accordingly scanned in parallel. Furthermore, an appropriate fixed optic 63 with positive refractive power is arranged between the Nipkow disc 64 and zoom optic 41, which converts the radiation coming through the pinholes in the Nipkow disc 64 into appropriate bundle diameters. In the Nipkow construction of FIG. 3, the primary color separator 17 is a classic dichroic beam separator, i.e. not the previously mentioned beam separator with a slotted or dotted reflecting area.

The zoom optic 41 corresponds to the previously explained construction, whereas scanner 18 naturally becomes superfluous due to the Nipkow disc 64. It can still be included if the selection of a region of interest according to FIG. 2 shall be made. The same applies for the Abbe-Koenig prism.

Figure 4:
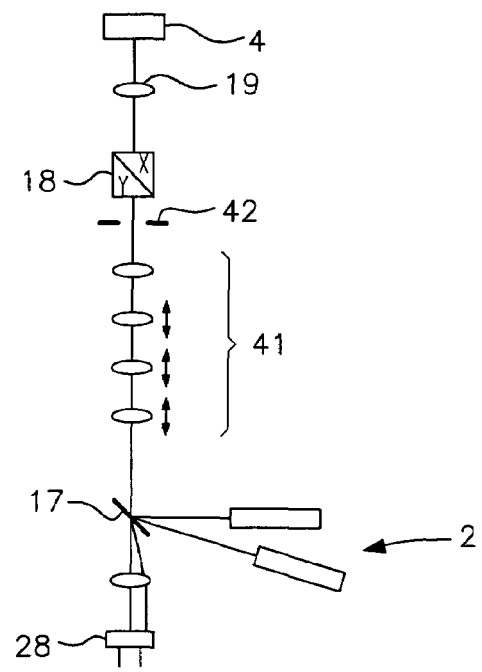

An alternative approach with multipoint scan is shown as a scheme in FIG. 4, where several light sources irradiate at an angle into the scanner pupil. Here too, the use of zoom optic 41 for the projection between primary color separator 17 and scanner 18 allows the realization of a zoom function as represented in FIG. 2. Through the simultaneous irradiation of light bundles under different angles in a plane conjugated to the pupil, light points in a plane conjugated to the object plane are created which are directed over a partial area of the entire object plane by scanner 18. The image information results from the evaluation of all partial images on a matrix detector 28 with local resolution.

Another version is a multipoint scan, as described in U.S. Pat. No. 6,028,306, which is fully included here in this regard. Here too, a detector 28 with local resolution is to be provided. The probe is then illuminated through a multipoint light source which is realized through an irradiation expander with subsequent micro lens array, which illuminates a multi aperture plate in a way that a multi point light source is realized hereby.

Illustration 5a shows a scan field of a line scanner with scan lines SL, which show a parallel offset to each other.

Correspondingly, these scan lines may also be created through line-by-line punctual scanning with a point scanner.

Offset a is larger here than the distance between the scanned lines at a scan rate which would lead to a maximally possible optical resolution of the microscope configuration. However, an object field may be scanned more rapidly, because the retention period per recorded line for the image recording determines the speed of the complete recording.

In illustration 5b, the scan lines are vertically shifted by a/2 or a/N, N=2, 3, the image recording of the individual lines occurs at distance-a, but in the spaces between the scanned lines of the scan procedure according to FIG. 1a.

Illustration 6 shows a scheme of a slider to adjust the proportion of the spatial and temporal resolution of the microscope and select the speed of the object which shall be examined.

The scan lines are shifted with the same scan rate at a certain interval (parallel offset of scanner is changed), but here not due to the bleaching effect but rather in order to achieve a compromise in recording rapid processes or movements with a high demand interval and simultaneous existence of quasi-static or slowly moving regions or formations in the probe (almost no movement), where a low demand interval is required for the image.

For example the scan field of 12 mm with 1024 possible lines is divided into 4 times 256 lines utilizing the optical resolution and is scanned four times shifted by one line.

The scanning of 256 lines thus occurs very rapidly. If the integration time for one line is approx. 20 microseconds, the recording of an image occurs in 256×20 microseconds, i.e. in about 5 milliseconds.

In the next scan (phase-delayed, next 256 lines), the resolution for the immobile object will be doubled, while rapidly moving objects appear out of focus. Scan undercuts are carried out until the limit of the optical resolution is reached. According to the Nysquist criteria, this limit is reached, when the sampling increments correspond to half of the optical resolution of the microscope. If for example to reach the Nysquist criteria 2048 lines must be scanned, the demand interval at which the structures with high spatial resolution may be examined, is 2048×20 microseconds, i.e. 40 milliseconds.

Rapidly moving objects initially appear out of focus (due to the lower spatial sampling resolution), once they remain in one place during the process they appear more clearly due to the repeated and offset scanning.

By recording with lower resolution and at a higher speed (as an overview scan), rapid movements become visible, which would not be visible in recordings with the highest resolution (due to the duration of the image recording).

Figure 6:
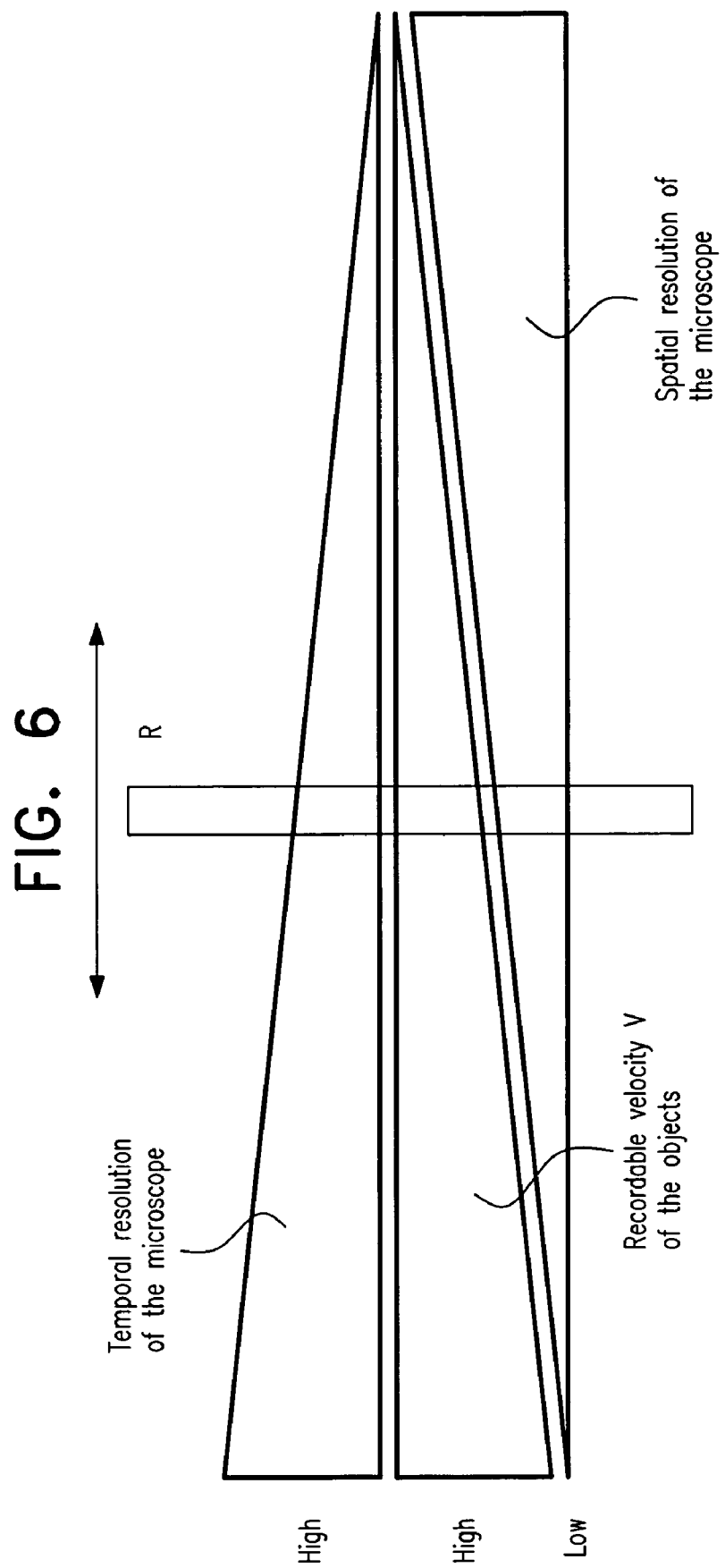

With the appropriate input instrument, for example a slider (FIG. 6), the relationship between the temporal resolution At (frame rate) of the recordable velocity V (as expected by the user), with which the objects move through the scan field, and the special resolution Ar, is adjusted. This always represents a compromise, which may be optimized by the user according to his expectations.

Rapidly moving objects measuring 100 micrometers may be present; in this case, a resolution of 1 micrometer is not necessary, the user could enter a resolution of 10 micrometers and use the increase of the recording speed to improve the acquisition of the object movements.

Objects which are static in comparison to the image rate of the microscope are represented with optical resolution at the diffraction limit.

Dynamic objects moving faster than the image rate are represented with a spatial resolution of the sampling rate, which is generally lower than the optical resolution. When recording a time series, dynamic objects initially appear out of focus, but as soon as they become static, they are represented with the resolution at the diffraction limit. Rapid dynamic objects may become visible by correlation of individual images to each other. This is done by coloring correlated points (of the images recorded successively) with one color and the remaining points with a different color.

A color coded overlay of fast and slow moving objects may occur, whereas the static image information may be separated by a correlation of the images. The image points correlating at different times are used for this purpose.

Figure 7B:
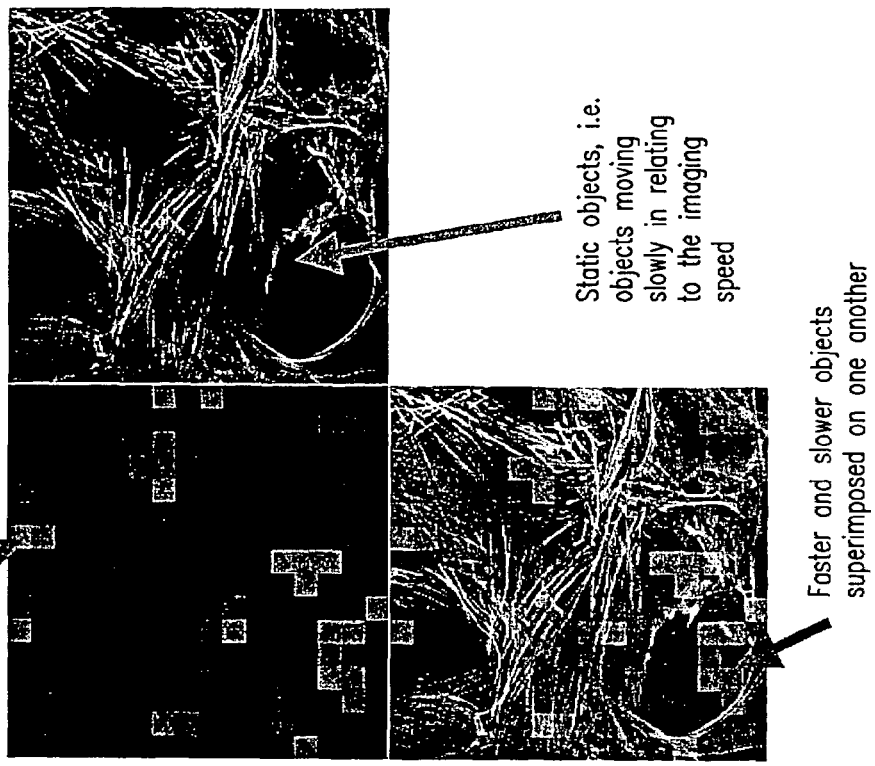
Figure 7A:
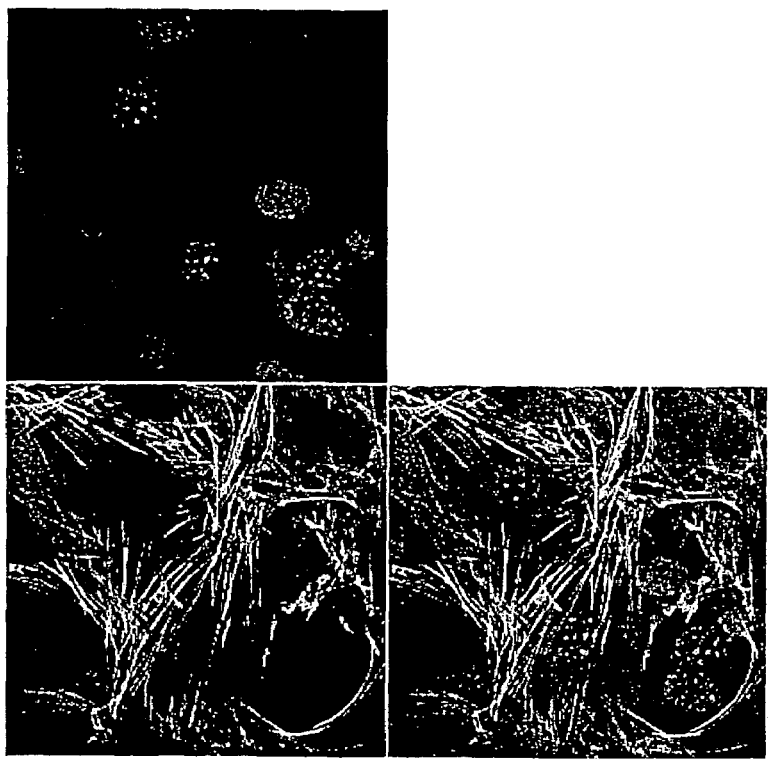

In FIG. 7a, a monitor image with high optical resolution is represented.

On the right, in an enlarged section of the left figure part, rapidly moving objects are represented, which are only visible in one location due to the high optical resolution. In FIG. 7b, the optical resolution has been lowered according to the invention (lower image rate).

Hereby, faster moving objects (represented in exaggeration) appear out of focus, whereas static objects continue to appear clearly. The movements of the unclear objects may be observed and recorded.

Figure 8:
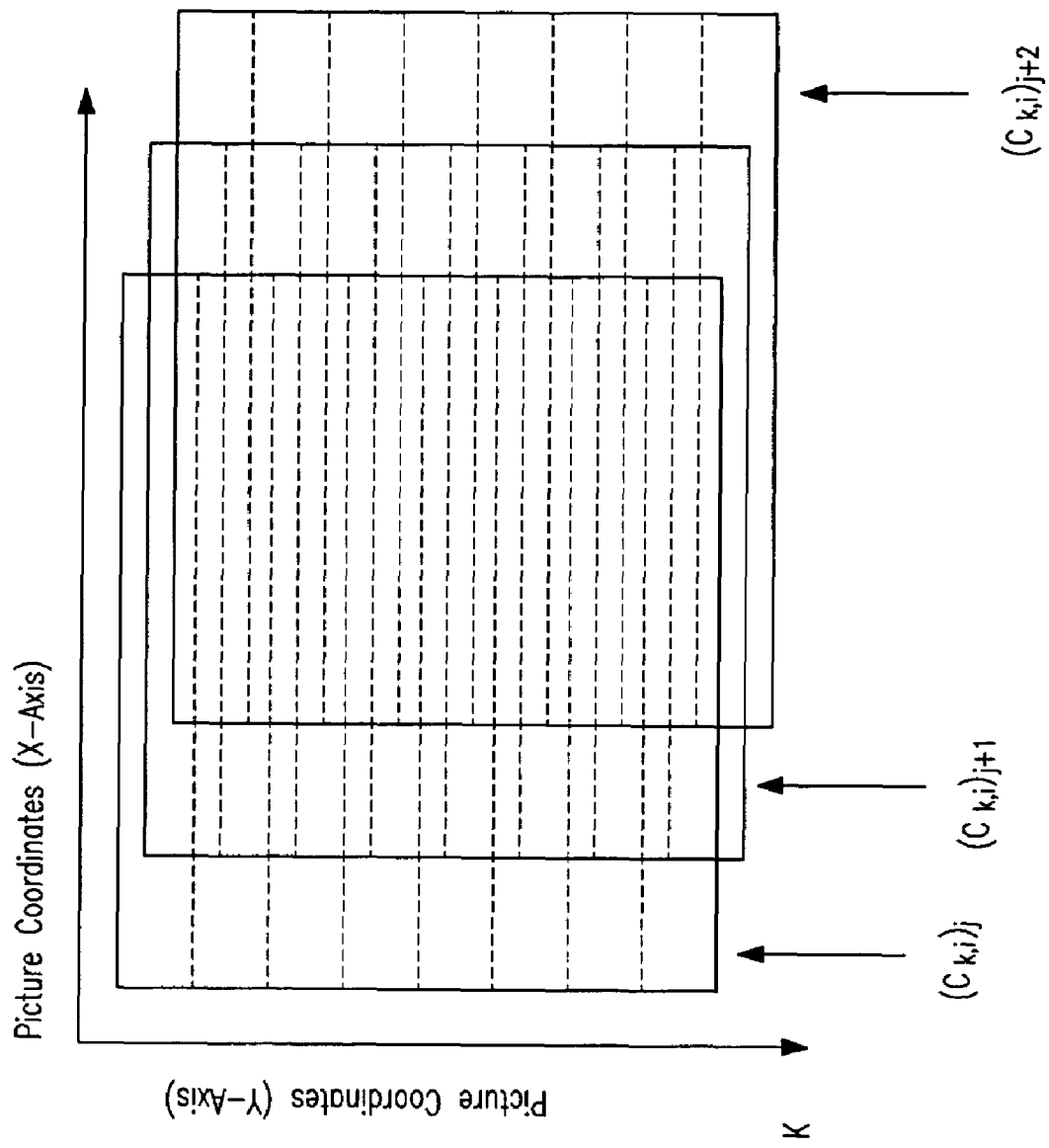

The creation of images with a reduced image rate is explained in FIG. 8.

Line detector is located on x-axis, shifting on y-axis, signals used for the formula (Ck,i) j shift increment is vertical (in y-direction)

The measured signals in individual channels are marked with $(c_{k,i,j})_j$, whereas i=1 ... N is the channel number of the line detector, k is the number of lines and j=0 ... n−1 is a multiple of the shift a/n. Per column, for the calculation of the N times n values $S_m$, differences of sums are calculated for individual values according to the following algorithm:

$$S_1 = c'_{1,0} = \sum_{i=1}^{N} c_{i,0} - \sum_{i=1}^{N-1} c_{i,1}$$

$$S_2 = c'_{1,1} = \sum_{i=1}^{N} c_{i,1} - \sum_{i=1}^{N-1} c_{i,2}$$

...

$$S_{n-1} = c'_{1,n-2} = \sum_{i=1}^{N} c_{i,n-2} - \sum_{i=1}^{N-1} c_{i,n-1}$$

$$S_n = c'_{1,n-1} = \sum_{i=1}^{N-1} c_{i,n-1} - \sum_{i=2}^{N} c_{i,0} - \sum_{m=1}^{n-2} c_{N,m}$$

...

$$S_{k \cdot n+1} = c'_{k,0} = \sum_{i=k}^{N} c_{i,0} - \sum_{i=k}^{N-1} c_{i,1}$$

$$S_{k \cdot n+2} = c'_{k,1} = \sum_{i=k}^{N} c_{i,1} - \sum_{i=k}^{N-1} c_{i,2}$$

...

$$S_{k \cdot n+j+1} = c'_{k,j} = \sum_{i=k}^{N} c_{i,j} - \sum_{i=k}^{N-1} c_{i,j+1}$$

...

$$S_{(k+1)n-1} = c'_{k,n-2} = \sum_{i=k}^{N} c_{i,n-2} - \sum_{i=k}^{N-1} c_{i,n-1}$$

$$S_{(k+1) \cdot n} = c'_{k,n-1} = \sum_{i=k}^{N-1} c_{i,n-1} - \sum_{i=k+1}^{N-1} c_{i,0} - \sum_{m=1}^{n-2} c_{N,m}$$

...

$$S_{N \cdot n - n} = c'_{N,0} = c_{N,0}$$

$$S_{N \cdot n - n + 1} = c'_{N,1} = c_{N,1}$$

...

$$S_{N \cdot n} = c'_{N,n-1} = c_{N,n-1}$$

The calculated S values (interim values per column) may then be graphically represented on the indicated image, e.g. by means of a scan.

Figure 9:
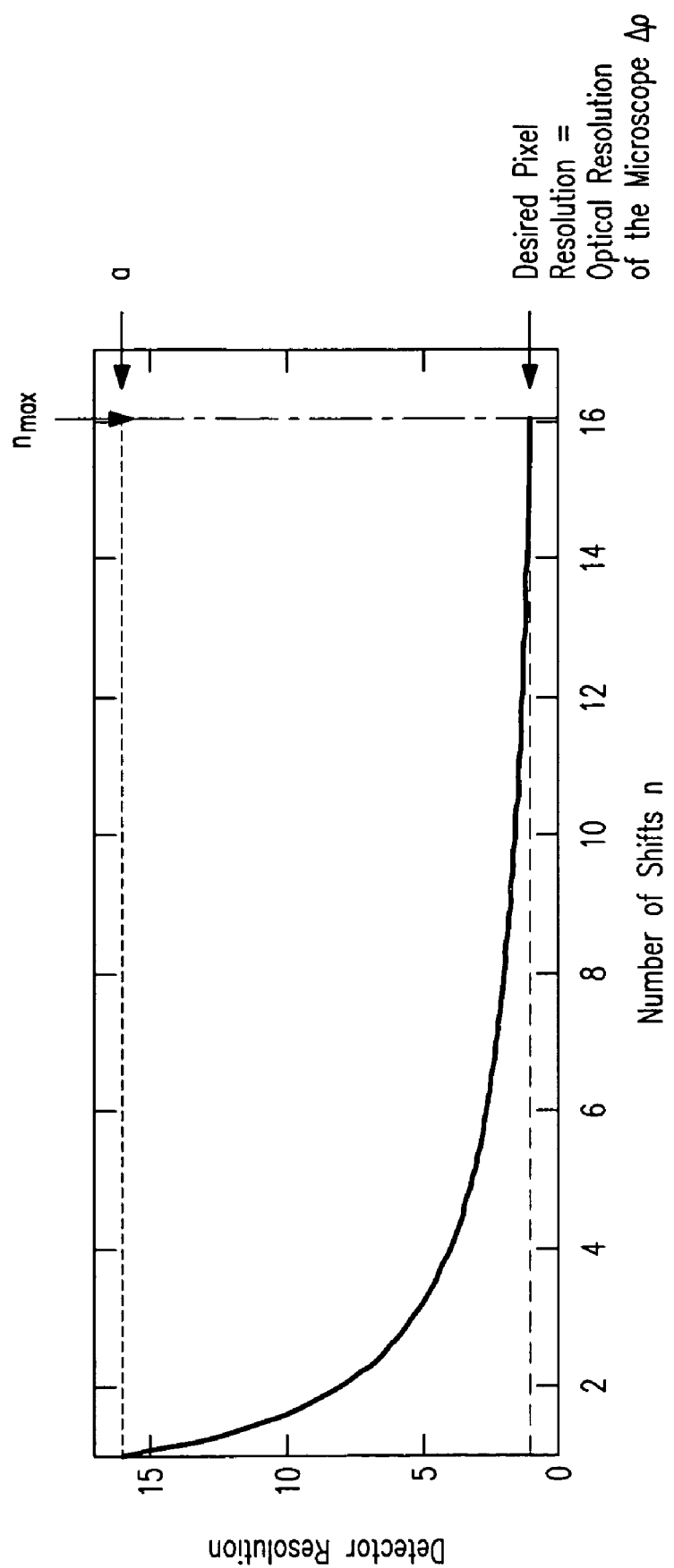

FIG. 9 shows the connection between the detector resolution and the number of shifts n based on the configuration described above. For n=1, the spatial resolution of the detection unit equals the spatial resolution of the increment (a). For 5 shifts at a/5, the spatial resolution of the detection unit is a/5. The maximum spatial resolution which may be achieved is determined by an optical limit resolution of the microscope.

$$n_{\max} = 2 \cdot \frac{L}{\Delta \rho}$$

According to the scan theorem by Nyquist, this maximum spatial resolution (_) is reached exactly when the detector resolution is equal to half of the potential resolution of the microscope (_). This corresponds to a number:

In the strip projection (7505), partial images are recorded and calculated and thus a higher resolution is achieved. If these partial images were utilized to obtain information, they could be used with a lower local resolution but a higher temporal resolution (e.g. three times faster).

Image information from the recorded partial images could thus be obtained, whereas by interpolation a scan of the image could be equalized, which could at the same time provide information on the rapid movements in the image. The grid could here be hidden by averaging over a grid period or by evaluating the maximum points. Illustration 2 shows a further definition of the invention:

If, due to the increased acquisition velocity of probes with a confocal microscope, lines or images are skipped, fluorescence probes show an irregular bleaching or strong bleaching of certain regions. With the procedure described here, a uniform bleaching of the probe may be achieved.

To increase the recording velocity in the acquisition of images with confocal microscopes, only every n-th line is illuminated and recorded (FIG. 10). The intensity values for the skipped lines are interpolated from the intensities of neighboring pixels. In time series and continuous data acquisition, individual lines in a fluorescence probe are bleached, while the neighboring regions are not bleached.

A reference acquisition here describes an image acquisition, where the metric distance of the recorded pixels is equal in both image directions. The image directions are designated with x- and y direction, whereas the x-direction in punctual illumination of the probe is the direction in which the point is rapidly moved during the scan of the probe. In an illumination of the probe line by line, the x-direction shall be the direction of the line. The y-direction shall be positioned vertically to the x-direction and in the image plane.

A whole-numbered nesting value n is determined, which indicates how many lines are skipped during the accelerated data acquisition in y-direction. During a repeated acquisition of an image, the probe will not be scanned in the same spot but rather shifted by a certain amount in y-direction. The amount of shifting may be different for every line. However, the procedure is simpler, if the same amount is used. In the simplest case, the amount of shifting corresponds to the value of the line distance in y-direction from the reference image, and illuminated in the n*i-th image acquisition with whole-numbered i in the same spot as in the first image.

With this procedure, a uniform bleaching of the probe is achieved. The maximum bleach effect for individual cells may be reduced approximately by the factor 1/n.

The procedure may be used for the acquisition of images with image planes of any orientation relative to the illumination direction. Apart from scanners and piezo drives, other drives may be used for the shifting.

For the acquisition of image batches, a procedure may be used which is based on the same idea and simply represents a generalization on a further dimension.

During this process, individual images of the batch recorded during the next acquisition of the batch are shifted vertically to the image plane. The procedures of the nested acquisition of images and batches may also be used simultaneously.

The invention is not based on the line by line scanning. In Nipkow scanners, the evaluation of a part of the perforated spirals or other perforated configurations could be eliminated in an initial step and then other perforated configurations could be used in a further step.

In multipoint configurations, that are moved over a probe, certain point areas or point lines could be used for evaluation.

The described invention represents a considerable increase of possibilities of use of rapid confocal laser scan microscopes. The significance of such a further development may be analyzed according to the standard literature on cell biology and the rapid cellular and sub-cellular procedures[1] described therein as well as the used research methods with a number of dyes[2].

See:

[1]B. Alberts et al. (2002): Molecular Biology of the Cell; Garland Science.
[1,2]G. Karp (2002): Cell and Molecular Biology: Concepts and Experiments; Wiley Text Books.
[1,2]R. Yuste et al. (2000): Imaging neurons—a laboratory Manual; Cold Spring Harbor Laboratory Press, New York.
[2]R. P. Haugland (2003): Handbook of fluorescent Probes and research Products, 10th Edition; Molecular Probes Inc. and Molecular Probes Europe BV.

The invention is particularly important for the following processes and procedures:

Development of Organisms

The described invention may be used, among other things, for the analysis of development processes, which are mainly characterized by dynamic processes from one tenth of a second up to an hourly range. Examples used on the level of united cell structures and whole organisms are described herein among other things:

In 2033, Abdul-Karim, M. A. et al. described in Microvasc. Res., 66:113-125 a long term analysis of blood vessel changes in live animals, whereas fluorescence images were recorded in intervals over several days. The 3D data acquisitions were evaluated with adaptive algorithms, in order to schematically represent movement trajectories.

In 2003, Soil, D. R. et al. described in Scientific World Journ. 3:827-841 a software based movement analysis of microscopic data of nuclei and pseudopodia of live cells in all 3 spatial dimensions.

In 2002, Grossmann, R. et al. described in Glia, 37:229-240 a 3D analysis of the movements of microglia cells in rats, whereas the data was recorded over a period of up to 10 hours. At the same time, after traumatic damage, fast reaction of the Glia could be observed, so that a high data rate and corresponding data volume results. This particularly concerns the following key points:

Analysis of live cells in a 3D environment, the neighboring cells of which react sensitively to laser and must be protected from the illumination in the 3D-ROI;

Analysis of live cells in a 3D environment with markings which shall be bleached systematically by laser in 3D, e.g., z.B. FRET experiments;

Analysis of live cells in a 3D environment with markings which are bleached systematically by laser and shall be observed at the same time outside of the ROI, e.g. FRAP- and FLIP-experiments in 3D;

Systematic analysis of live cells in a 3D environment with markings and drugs showing manipulation determined changes by laser illumination, e.g. activation of transmitters in 3D;

Systematic analysis of live cells in a 3D environment with markings showing manipulation determined color changes by laser illumination, e.g. paGFP, Kaede;

Systematic analysis of live cells in a 3D environment with very weak markings, which require an optimal balance of confocality against detection sensitivity.

Live cells in a 3D tissue compound with varying multiple markings, e.g. CFP, GFP, YFP, DsRed, HcRed or similar.

Live cells in a 3D tissue compound with markings showing function determined color changes, e.g. Ca+ markers Live cells in a 3D tissue compound with markings showing development determined color changes, e.g. transgenic animals with GFP Systematic analysis of live cells in a 3D environment with markings showing manipulation determined color changes by laser illumination, e.g. paGFP, Kaede Systematic analysis of live cells in a 3D tissue compound with very weak markings, which require a restriction of confocality in favor of the detection sensitivity.

The last named point is combined with the preceding.

Transportation Processes in Cells

The described invention is excellent for the examination of intracellular transportation processes, since relatively small motile structures, e.g. proteins, with high speed, must be represented here (mostly in the area of hundredth of seconds). In order to record the dynamics of complex transportation processes, applications such as FRAP with ROI bleaches are often sed. Examples for such studies are described in the following:

In 2000, Umenishi, F. et al. described in Biophys J., 78:1024-1035 an analysis of the spatial mobility of Aquaporin in GFP transfected culture cells. For this purpose, points in the cell membrane were systematically and locally bleached and the diffusion of the fluorescence was analyzed in the environment.

In 2002, Gimpl, G. et al. described in Prog. Brain Res., 139:43-55 experiments with ROI bleaches and fluorescence imaging to analyze the mobility and distribution of GFP marked Oxytocin receptors in fibroblasts. This poses high requirements to the spatial positioning and resolution as well as the direct temporal consequence of bleaching and imaging.

In 2001, Zhang et al. described in Neuron, 31:261-275 live cell imaging of GFP transfected nerve cells, whereas the movement of granuli was analyzed by combining bleach and fluorescence imaging. The dynamics of the nerve cells places high requirements to the velocity of the imaging.

Interaction of Molecules

The described invention is particularly convenient to represent molecular and other sub-cellular interactions. Herein, very small structures with high velocity (in the area of hundredth of seconds) must be represented. In order to dissolve the spatial position of the molecules required for the interaction, indirect techniques such as FRET with ROI bleaches are used.

Used examples are described in the following:

In 2004, Petersen, M. A. and Dailey, M. E. describe in Glia, 46:195-206 a dual channel acquisition of live hippocampus cultures in rats, whereas two channels were recorded spatially in 3D and over a longer period of time for the markers Lectin and Sytox.

In 2003, Yamamoto, N. et al. described in Clin. Exp. Metastasis, 20:633-638 a two color imaging of human fibrosarcoma cells, wherein green and red fluorescent protein (GFP and RFP) were observed simultaneously in real time.

In 2003, Bertera, S. et al. described in Biotechniques, 35:718-722 a multicolor imaging of transgenic mice marked with timer reporter protein, which changes its color from green to red. The image acquisition occurs as fast series 3-dimensionally inside the tissue of a live animal.

Signal Transfer Between Cells

The described invention is excellent for the examination of extremely fast signal transfer procedures. These often neurophysiological processes pose high requirements to the temporal resolution, since the activities transmitted by ions are in the range of hundredths to less than thousandths of seconds. Used examples of studies of the muscle and nerve system are described here:

In 2000, Brum G et al. described in J. Physiol. 528: 419433 the localization of rapid Ca+ activities in the muscle cells of a frog after stimulation with caffeine as a transmitter. The localization and micrometer precise resolution was only possible due to the use of a fast confocal microscope.

In 2003, Schmidt H et al. described in J. Physiol. 551: 13-32 an analysis of Ca+ ions in nerve cell appendages of transgenic mice. The study of rapid Ca+ transients in mice with altered Ca+ binding proteins could only be carried out with the help of high resolution confocal microscopy, since a localization of the Ca+ activity within the nerve cell and its exact temporal kinetics play an important role.

The invention claimed is:

1. Process for image acquisition of objects using a light raster microscope with line by line scanning, comprising the steps of:
   (a) scanning of a probe in parallel scan lines in a scanning direction for the creation of a probe image, wherein the distance between at least two scan lines is variably adjustable,
   (b) carrying out at least a second scanning of the probe, during which the position of the scan lines is shifted with regard to the scanning direction, and
   (c) changing the proportion between spatial and temporal resolution of the microscope.

2. Process according to claim 1, further comprising the step of acquiring probe points using one of a line scanner, a Nipkow scanner, and a multipoint scanner.

3. Process according to claim 1, further comprising the step of recording a time series with several acquisitions of probe images.

4. Process according to claim 3, further comprising the step of correlating the images of the time series with each other to represent a movement.

5. Process according to claim 3, wherein in step (b), the amount by which the position of the scan lines is shifted is adjustable.

6. Process according to claim 1, further comprising the step of making a color coded representation of the probe and regions in the probe based on a velocity of the probe and the regions in the probe.

7. Process for uniform illumination of a probe with a light raster microscope, comprising the steps of:
   (a) scanning of a probe in parallel scan lines in a scanning direction for the creation of a probe image, wherein the distance between at least two scan lines is variably adjustable, and
   (b) carrying out at least a second scanning of the probe. during which the position of the scan lines is shifted with regard to the scanning direction, wherein in step (b), the distance between at least two scan lines during the at least second scanning is greater than the distance between at least two scan lines during the scanning of step (a), in order to accelerate data acquisition.

8. Process according to claim 7, wherein the probe is bleached.

9. Process for image acciuisition of objects using a light raster confocal microscope with line by line scanning, comprising the steps of:
   (a) scanning of a probe in parallel scan lines in a scanning direction for the creation of a probe image, wherein the distance between at least two scan lines is variably adjustable,
   (b) carrying out at least a second scanning of the probe, during which the position of the scan lines is shifted with regard to the scanning direction,
   (c) dividing a scan field into a predetermined number of possible scan lines, wherein each scan line comprises a plurality of pixels, and wherein in both of steps (a) and (b), only every n-th scan line of the scan field is illuminated and recorded, and
   (d) interpolating the intensity values for the scan lines that are not illuminated based on the intensities of neighboring pixels that are illuminated, to increase the recording velocity in the acquisition of images.

* * * * *